(12) United States Patent
Flammer, III (10) Patent No.: US 9,485,629 B2
(45) Date of Patent: Nov. 1, 2016

(54) CONFIRMED LINK LEVEL BROADCAST USING PARALLEL RECEIVERS

(71) Applicant: Silver Spring Networks, Inc., Redwood City, CA (US)

(72) Inventor: George H. Flammer, III, Cupertino, CA (US)

(73) Assignee: Silver Spring Networks, Inc., San Jose, CA (US)

( * ) Notice: Subject to any disclaimer, the term of this patent is extended or adjusted under 35 U.S.C. 154(b) by 823 days.

(21) Appl. No.: 13/669,418

(22) Filed: Nov. 5, 2012

(65) Prior Publication Data

US 2014/0010138 A1 Jan. 9, 2014

Related U.S. Application Data

(60) Provisional application No. 61/668,414, filed on Jul. 5, 2012.

(51) Int. Cl.
*H04W 4/06* (2009.01)
*H04L 1/18* (2006.01)
*H04W 84/18* (2009.01)

(52) U.S. Cl.
CPC .............. *H04W 4/06* (2013.01); *H04L 1/1825* (2013.01); *H04L 1/1854* (2013.01); *H04L 1/1864* (2013.01); *H04W 84/18* (2013.01)

(58) Field of Classification Search
CPC ... H04W 84/18; H04L 1/1825; H04L 1/1854
See application file for complete search history.

(56) References Cited

U.S. PATENT DOCUMENTS 5,638,369 A * 6/1997 Ayerst et al. ................. 370/346

* cited by examiner

*Primary Examiner* — Siming Liu
(74) *Attorney, Agent, or Firm* — Artegis Law Group, LLP (57) ABSTRACT

A source node residing within a wireless mesh network is configured to transmit data packets to downstream nodes also residing within the wireless mesh network. Upon receipt of a data packet, a given downstream node determines a channel on which to transmit an acknowledgement packet and a sub-interval of time during which to transmit the acknowledgement packet based on a short ID assigned by the source node. At the determined sub-interval of time, the downstream node transmits the acknowledgement packet to the source node on the determined channel.

23 Claims, 7 Drawing Sheets

CONFIRMED LINK LEVEL BROADCAST USING PARALLEL RECEIVERS

CROSS-REFERENCE TO RELATED APPLICATIONS

This application claims the benefit of U.S. provisional patent application titled "Confirmed Link Level Broadcast Using Parallel Receivers," filed on Jul. 5, 2012 and having Ser. No. 61/668,414. The entire content of the foregoing application is hereby incorporated herein by reference.

BACKGROUND OF THE INVENTION

1. Field of the Invention

Embodiments of the present invention relate generally to wireless digital communication and, more specifically, to confirmed link level broadcasts using parallel receivers.

2. Description of the Related Art

A conventional wireless mesh network includes a plurality of nodes configured to communicate with one another. A given node within the wireless mesh network may transmit messages to, and receive messages from, neighboring nodes in order to propagate those messages across the entire network. A source node may thus communicate with a destination node by way of intermediate nodes within the network.

When a source node transmits a message to a destination node, an application executing within the destination node may respond by transmitting an acknowledgement message back to the source node. This acknowledgment message is propagated across the wireless mesh network in the same fashion as the original message transmitted by the source node, i.e. by way of intermediate nodes. In situations where the application within the destination node fails to respond to the source node with an acknowledgement message, the source node may then re-send the original message. The acknowledgement technique described above is known in the art as "application layer acknowledgement."

Application layer acknowledgement suffers from at least two drawbacks. First, the acknowledgement transmitted from the destination node may require a large number of "hops" across intermediate nodes before propagating back to the source node. Consequently, a correspondingly large amount of time may elapse before the source node is able to determine whether the message successfully arrived at the destination node or should be re-sent. Second, in situations where multiple destination nodes are targeted by single source node transmission (e.g., a broadcast or multicast transmission), the source node may become flooded with multiple acknowledgement messages that are simultaneously received from the multiple destination nodes. Such a flood may overwhelm and potentially disable the source node.

As the foregoing illustrates, what is needed in the art is an improved technique for acknowledging message transmissions in a wireless mesh network.

SUMMARY OF THE INVENTION

One embodiment of the present invention sets forth a computer-implemented method for acknowledging receipt of a data packet transmitted by a first node to a second node within a network, including receiving a first short identification (ID) from the first node, receiving the data packet from the first node, determining a first channel based on the first short ID, where the first node is configured to receive transmissions on the first channel, determining a first sub-interval of time based on the first short ID, where the first node is configured to receive transmissions on the first channel during a first interval of time that includes the first sub-interval of time, and transmitting a first acknowledgement packet to the first node on the first channel during the first sub-interval of time, where the first acknowledgement packet indicates that the second node received the data packet transmitted by the first node.

One advantage of the disclosed technique is that, when a given node fails to receive a data packet from an upstream node, the upstream node may quickly determine that the data packet should be re-transmitted. Configuring upstream nodes with this capability increases the reliability of the network. Further, each upstream node is capable of coordinating incoming acknowledgement packets from downstream nodes, thereby preventing situations where a flood of acknowledgement packets overwhelms the upstream node.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
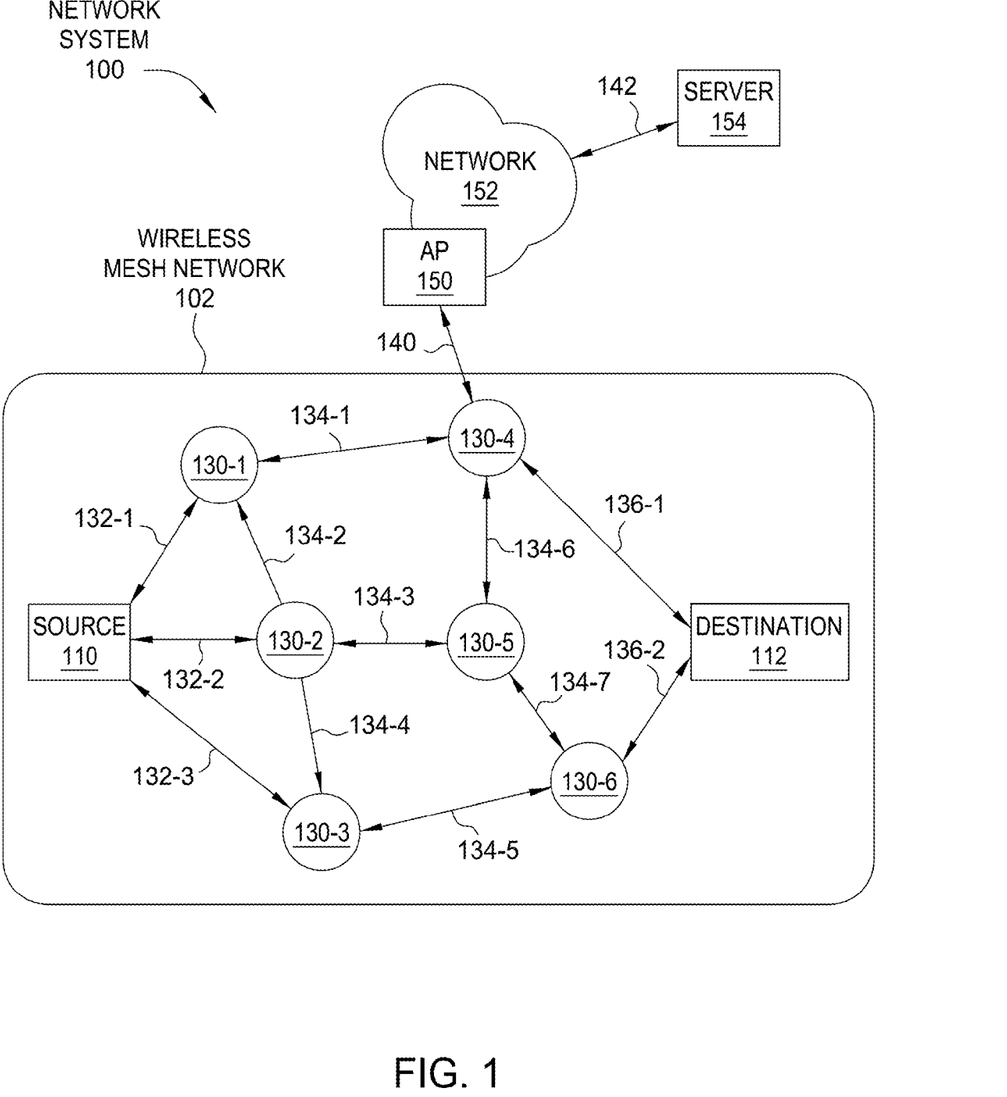
FIG. 1 illustrates a network system configured to implement one or more aspects of the invention.

FIG. 1 illustrates a network system 100 configured to implement one or more aspects of the invention. As shown, the network system 100 includes a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing from the scope and spirit of embodiments of the present invention.

The discovery protocol may also be implemented to determine the hopping sequences of adjacent nodes, i.e. the sequence of channels across which nodes periodically receive payload data. As is known in the art, a "channel" may correspond to a particular range of frequencies. The time required by a node 130 to cycle through all channels in the hopping sequence associated with that node is referred to as an "epoch." An epoch may be divided into intervals of time during which a node 130 receives or transmits payload data on a given channel. An interval may be divided into sub-intervals of time, during which the node 130 may acknowledge receipt of payload data, as described in greater detail below in conjunction with FIGS. 3-7.

Once adjacency is established between the source node 110 and at least one intermediate node 130, the source node 110 may generate payload data for delivery to the destination node 112, assuming a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or Ethernet media access control (MAC) address.

Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address, and each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

In network system 100, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The network 152 is coupled to the server 154 via communications link 142. The access point 150 is coupled to the network 152, which may comprise any wired, optical, wireless, or hybrid network configured to transmit payload data between the access point 150 and the server 154.

In one embodiment, the server 154 represents a destination for payload data originating within the wireless mesh network 102 and a source of payload data destined for one or more nodes within the wireless mesh network 102. In one embodiment, the server 154 executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting.

The techniques described herein are sufficiently flexible to be utilized within any technically feasible network environment including, without limitation, a wide-area network (WAN) or a local-area network (LAN). Moreover, multiple network types may exist within a given network system 100. For example, communications between two nodes 130 or between a node 130 and the corresponding access point 150 may be via a radio-frequency local-area network (RF LAN), while communications between access points 150 and the network may be via a WAN such as a general packet radio service (GPRS). As mentioned above, each node within wireless mesh network 102 includes a network interface that enables the node to communicate wirelessly with other nodes. Each node 130 may implement the first and/or second embodiments of the invention, as described above, by operation of the network interface. An exemplary network interface is described below in conjunction with FIG. 2.

Figure 2:
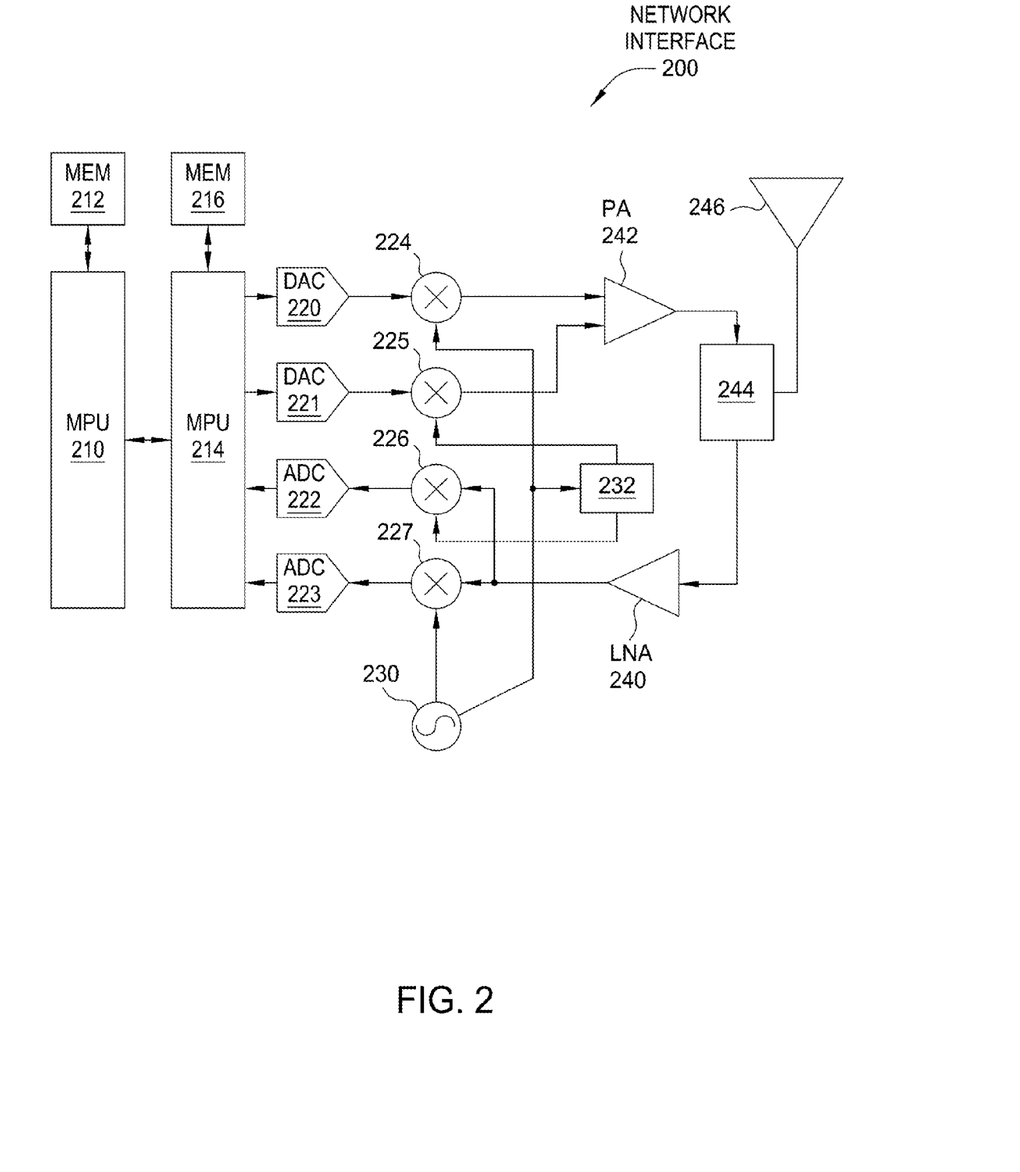
FIG. 2 illustrates a network interface configured to transmit and receive data within a mesh network, according to one embodiment of the invention.

FIG. 2 illustrates a network interface 200 configured to implement multi-channel operation, according to one embodiment of the invention. Each node 110, 112, 130 within the wireless mesh network 102 of FIG. 1 includes at least one instance of the network interface 200. The network interface 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage. Memory 212 and/or memory 216 may be used to store data structures such as, e.g., a forwarding database, and/or routing tables that include primary and secondary path information, path cost values, and so forth.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In one embodiment, MPU 210 implements the techniques performed by the node, as described in conjunction with FIGS. 1 and 3-7, when MPU 210 executes a firmware program stored in memory within network interface 200.

The MPU 214 is coupled to DAC 220 and DAC 221. Each DAC 220, 221 is configured to convert a stream of outbound digital values into a corresponding analog signal. The outbound digital values are computed by the signal processing procedures for modulating one or more channels. The MPU 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values. Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Figure 3:
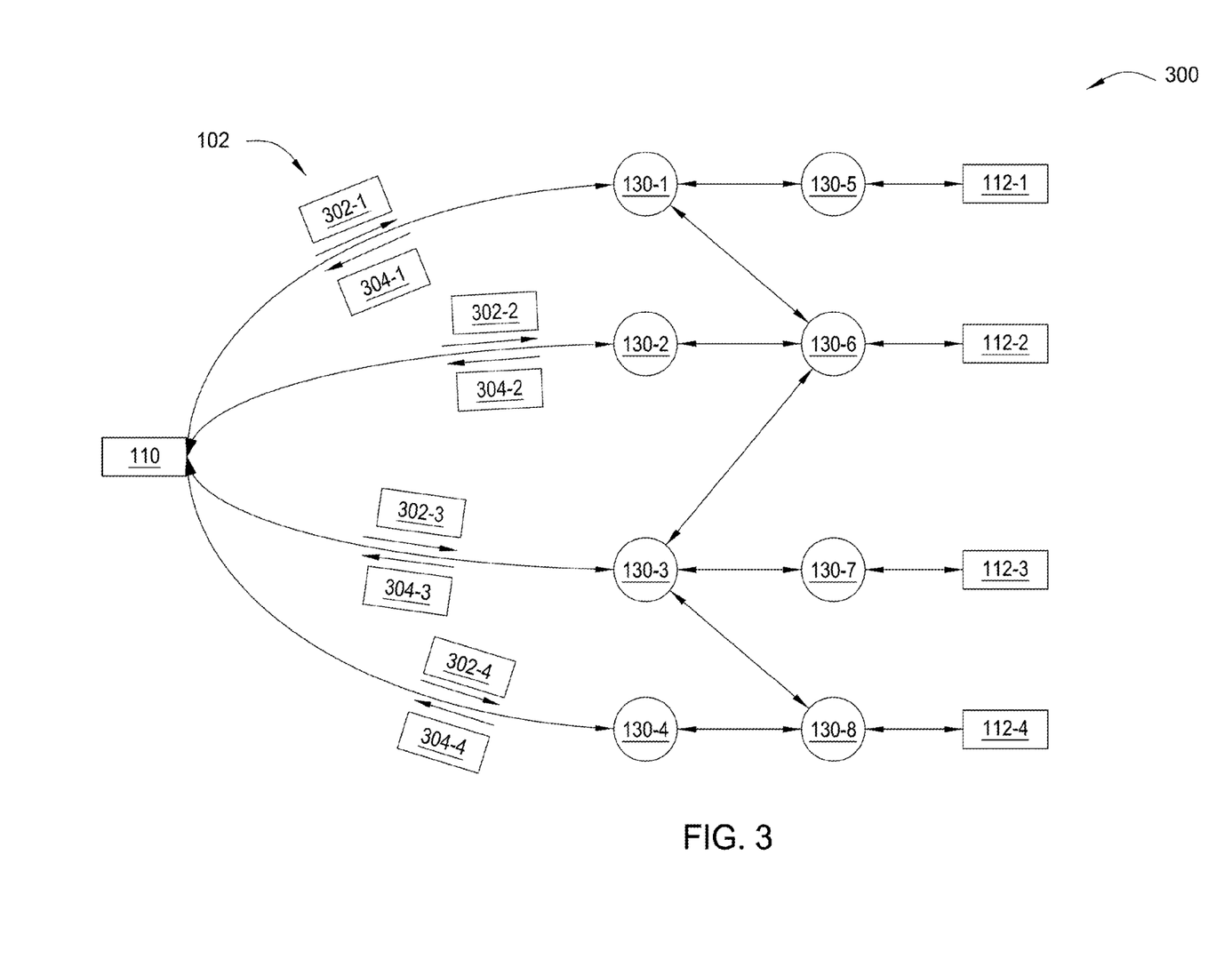
FIG. 3 is a conceptual diagram that illustrates a portion of the network system of FIG. 1, according to one embodiment of the invention.

FIG. 3 is a conceptual diagram that illustrates a portion 300 of the wireless mesh network 102 of FIG. 1, according to one embodiment of the invention. As shown, the portion 300 of the wireless mesh network 102 includes source node 110 coupled to destination nodes 112 by nodes 130. Source node 110 is configured to transmit data packets 302 to destination nodes 112 via nodes 130. As shown, source node 110 transmits data packet 302-1 to node 103-1, data packet 302-2 to node 103-2, data packet 302-3 to node 103-3, and data packet 302-4 to node 103-4. Each of those nodes 130 is configured to relay the corresponding data packet 304 to one of destination nodes 112. Node 130-1 may relay data packet 302-1 to destination node 112-1 by way of node 130-5, node 130-2 may relay data packet 302-2 to destination node 112-2 by way of node 130-6, node 130-3 may relay data packet 302-3 to destination node 112-3 by way of node 130-7, and node 130-4 may relay data packet 302-4 to destination node 112-4 by way of node 130-8.

When source node 110 transmits a data packet 302 to a given node 130, node 130 is configured to respond to source node 110 by transmitting an acknowledgement packet 304 back to source node 110. Node 130-1 is configured to transmit acknowledgement packet 304-1 back to source node 110, node 130-2 is configured to transmit acknowledgement packet 304-2 back to source node 110, node 130-3 is configured to transmit acknowledgement packet 304-3 back to source node 110, and node 130-4 is configured to transmit acknowledgement packet 304-4 back to source node 110. Source node 110 is configured to receive transmissions on a variety of different channels simultaneously, and may thus receive multiple acknowledgement packets 304 on different channels simultaneously. Source node 110 coordinates the transmission of acknowledgement packets 304 using an acknowledgement scheduling table, as discussed in greater detail below in conjunction with FIG. 5.

A data packet 302 and a corresponding acknowledgment packet 304 may be transmitted between source node 110 and nodes 130 during different timeslots. As mentioned above, a timeslot is an interval of time during which a node may send or receive data. The transmission of data packet 302 or acknowledgement packet 304 may require some or all of the time interval allocated for a given timeslot, depending on the type of packet being sent, as described in greater detail below in conjunction with FIGS. 4A and 4B, respectively.

Figure 4A:
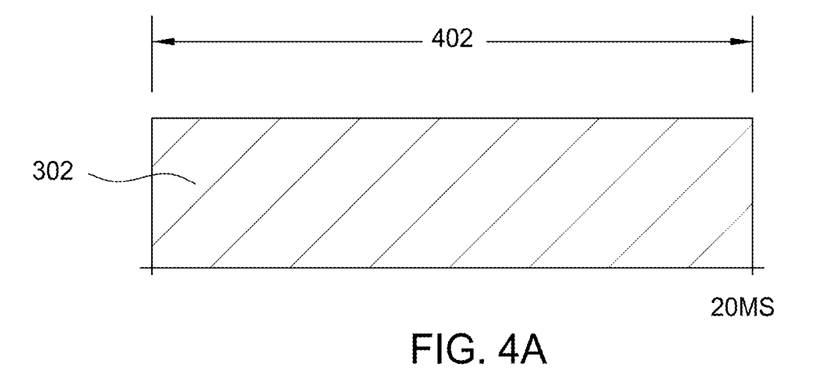
FIGS. 4A and 4B are conceptual diagrams illustrating different types of data packets, according to one embodiment of the invention.

FIG. 4A is a conceptual diagram that illustrates a data packet 302, according to one embodiment of the invention. As shown, data packet 302 occupies an interval 402 that is 20 ms long and, accordingly, requires a 20 ms interval of time to transmit. Those skilled in the art will understand that data packet 302 could be transmitted during any interval of time and thereby have any "length."

Figure 4B:
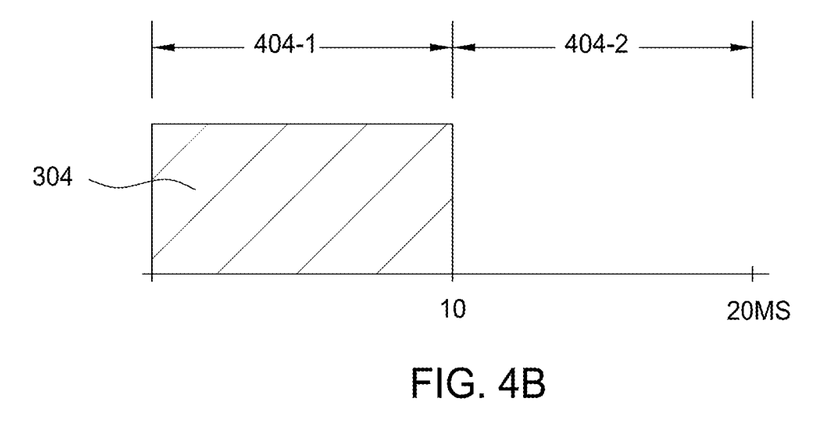

Referring now to FIG. 4B, conceptual diagram 450 illustrates an acknowledgement packet 304 that occupies a shorter interval of time than data packet 302. As shown, acknowledgement packet 302 occupies a sub-interval 404-1 that is 10 ms long and, accordingly, requires a 10 ms interval of time to transmit. Those skilled in the art will understand that acknowledgement packet 302 could be transmitted during any interval of time and thereby have any "length." Since acknowledgement packet 304 only requires a portion of interval 402 to be transmitted, acknowledgement packet 304 may be transmitted during any of sub-intervals 404-1 or 404-2. Those skilled in the art will recognize that interval 402 may be subdivided into any number of different sub-intervals 404, and that an acknowledgement packet 304 having an appropriate length may be transmitted during any of those sub-intervals 404.

A given node 130 may select which sub-interval 404 during which to transmit acknowledgement packet 304, as well as a specific channel on which to transmit the acknowledgement packet 304, based on a short identification number assigned to that node 130 by source node 110. Source node 110 assigns a short identification number (referred to hereinafter as "short ID") to each node 130 immediately downstream of source node 110 based on an acknowledgement scheduling table, as discussed in greater detail below in conjunction with FIG. 5.

Figure 5:
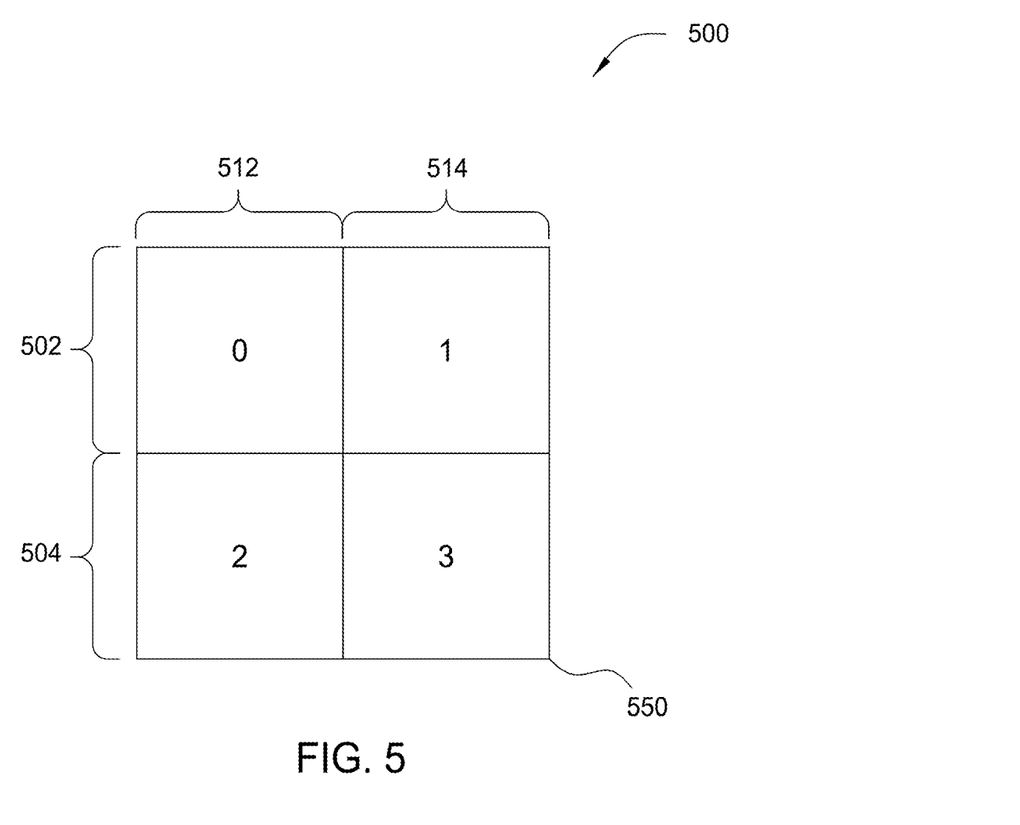
FIG. 5 is a conceptual diagram that illustrates an acknowledgement scheduling table, according to one embodiment of the invention.

FIG. 5 is a conceptual diagram 500 that illustrates an acknowledgement scheduling table 550, according to one embodiment of the invention. As shown, acknowledgement scheduling table 550 includes rows 502 and 504 as well as columns 512 and 514. In general, acknowledgement scheduling table 550 includes a number of rows equal to the number of channels on which source node 110 is capable of receiving transmissions, and a number of columns equal to the number of sub-intervals 404 within an interval 402. As is shown, acknowledgement scheduling table 550 includes two rows 502 and 504 corresponding to two channels (channel "0" and channel "1", respectively), and two columns 512 and 514 corresponding to two sub-intervals (404-1 and 404-2, respectively). Those skilled in the art will understand that an acknowledgement scheduling table having any number of rows and/or columns falls within the scope of the invention.

Each cell of acknowledgement scheduling table 550 includes a short ID that source node 110 may assign to a particular node 130. Source node 110 may populate acknowledgement scheduling table 550 by incrementally adding numbers to the columns in each row until that row is complete, and then proceeding to the next row. Source node 110 is configured to generate a number of short IDs equal to the number of downstream nodes 130. Accordingly, acknowledgement scheduling table 550 may not necessarily be "full" because acknowledgement scheduling table 550 may include more cells than the number of nodes 130 downstream of source node 110. Once source node 110 has generated acknowledgement scheduling table 550, source node 110 transmits a different short ID to each downstream node 130.

In the exemplary embodiment discussed herein, acknowledgement scheduling table 550 assigns node 130-1 a short ID of "0", assigns node 130-2 a short ID of "1", assigns node 130-3 a short ID of "2", and assigns nodes 130-4 a short ID of "3" and transmits those short IDs to the corresponding node 130.

When a given node 130 receives a data packet 302, the node 130 then selects a sub-interval 404 during which to transmit acknowledgement packet 304 (referred to herein as an "acknowledgement sub-interval"), as well as a specific channel on which to transmit the acknowledgement packet 304 (referred to herein as an "acknowledgement channel"), based on the short ID assigned by the source node 110, as also mentioned above. For example, when node 130-3 receives data packet 302-3, node 130-3 determines, based on having a short ID of "2", that acknowledgement packet 304 should be transmitted on channel 1 during subinterval 404-1.

In one embodiment, a node 130 determines an acknowledgement channel by dividing the short ID received from source node 110 by the number of channels on which source node 110 may receive transmissions. Node 130 may also determine the acknowledgement sub-interval by computing the modulo of the number of channels with the short ID. In this embodiment, node 130 would receive the total number of channels used by source node 110 and the total number of sub-intervals within an interval during the discovery process outlined above in conjunction with FIG. 1. Those skilled in the art will recognize that various other techniques may be implemented to identify an acknowledgement channel and acknowledgement sub-interval based on a short ID.

In general, each short ID specifies a different channel/sub-interval pair that a given node 130 may use to transmit an acknowledgement packet 304. By using this technique, source node 110 may coordinate incoming acknowledgement packets 304 to arrive at unique times and separate channels.

In further embodiments, each node 130 may act as a source node relative to downstream nodes. For example, referring back to FIG. 3, nodes 130-1, 130-2, 130-3, and 13-4 may act as source nodes relative to nodes 130-5, 130-6, 130-7, and 130-8. Accordingly, a given node 130 may generate an acknowledgement scheduling table 550 based on the number of simultaneous receive channels associated with that node 130 and the number of sub-intervals within an interval. The node 130 may then assign a short ID to each downstream node 130 and thereby coordinate incoming acknowledgement packets 304 in like fashion as described above.

Since a given downstream node 130 may have more than one upstream source node, any node 130 may have more than one short ID, each short ID having been received from a different source node. For example, node 130-6 could receive one short ID from node 130-1, another short ID from node 130-2, and yet another short ID from node 130-3. When node 130-6 transmits an acknowledgement packet 304 to a particular upstream node (one of nodes 130-1, 130-2, or 130-3), node 130-6 determines the channel and subinterval for the acknowledgement packet 304 based on the short ID assigned by that particular upstream node. As such, each node 130 may record a table of upstream nodes 130 and corresponding short IDs assigned by those upstream nodes 130.

By implementing the techniques described herein, data packets 304 may be propagated across the entire wireless mesh network 102 with link-level acknowledgments, thereby increasing the reliability with which data packets can be transmitted. Further, coordinating the acknowledgement packets by assigning short IDs allows a given source node to coordinate all incoming acknowledgement packets.

Figure 6:
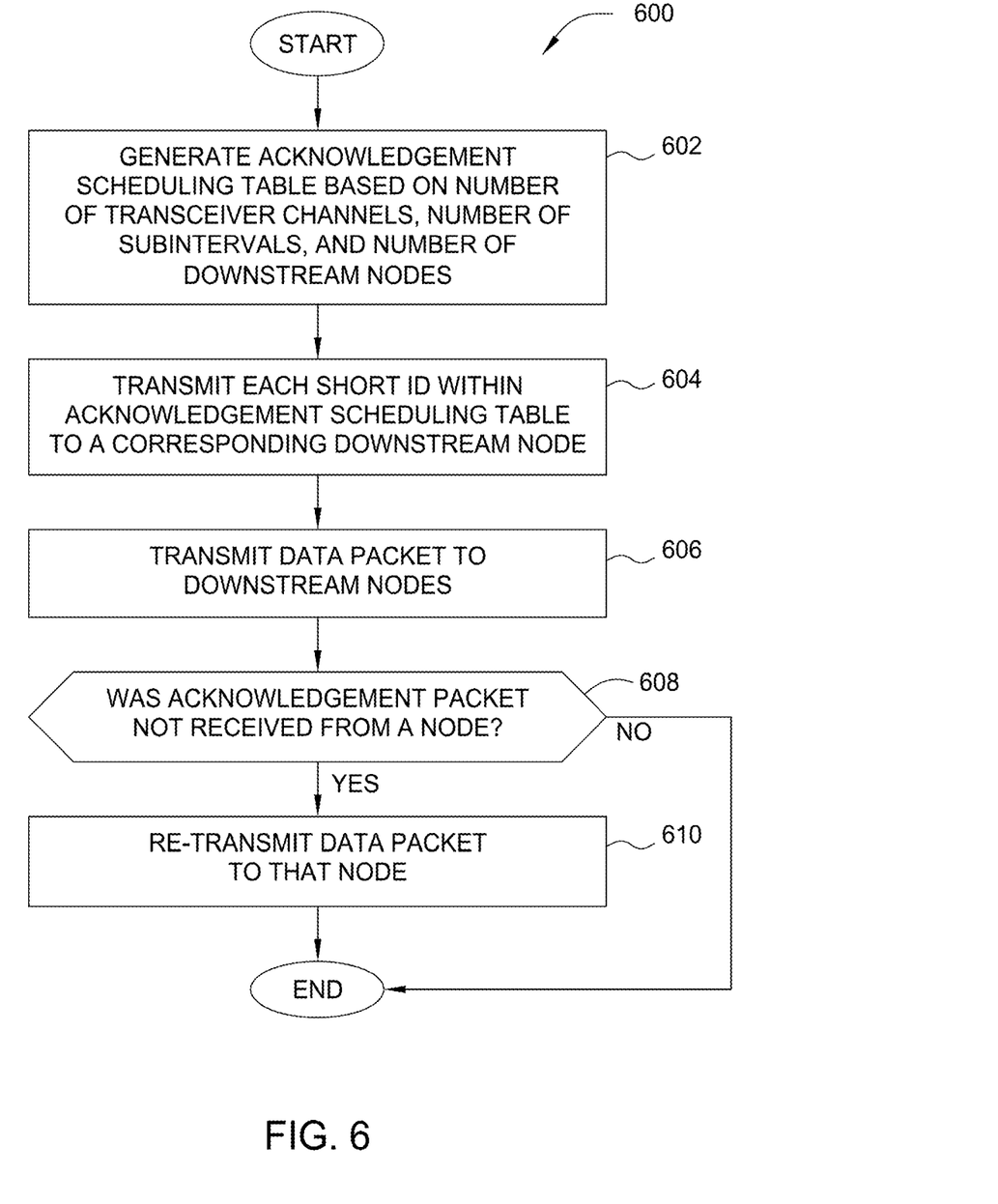
FIG. 6 is a flowchart of method steps for assigning a short identification (ID) to a set of downstream nodes, according to one embodiment of the invention.

FIG. 6 is a flowchart of method steps for assigning a short identification (ID) to a set of downstream nodes, according to one embodiment of the invention. Although the method steps are described in conjunction with the systems of FIGS. 1-3, persons skilled in the art will understand that any system configured to perform the method steps, in any order, is within the scope of the present invention.

As shown, a method 600 begins at step 602, where source node 110 generates acknowledgement scheduling table 550 based on the number of transceiver channels used by the source node 110, the number of sub-intervals within an interval, and the number of downstream nodes. In general, acknowledgement scheduling table 550 includes a number of rows equal to the number of transceiver channels and a number of columns equal to the number of sub-intervals 404 within an interval 402. Source node 110 may then populate cells of the acknowledgement scheduling table 550 with unique short IDs based on the number of downstream nodes 130, where each short ID corresponds to a different downstream node 130.

At step 604, source node 110 transmits each short ID within acknowledgement scheduling table 550 to a corresponding downstream node 130. At step 606, source node 110 transmits a data packet 302 to one or more downstream nodes 130. At step 608, source node 110 determines whether an acknowledgement packet 304 was not received from a downstream node 130. If source node 110 determines that an acknowledgement packet 304 was received from each downstream node 130, then the method 600 ends. Otherwise, if source node 110 determines that an acknowledgement packet 304 was not received from a downstream node 130, then the method proceeds to step 610, where source node 110 re-transmits the data packet 302 to the node 130 that did not transmit an acknowledgment packet 304. The method 600 then ends.

Source node 110 may repeat some or all steps of the method 600 multiple times, as necessary, until each downstream node transmits an acknowledgement packet 304 back to source node 110. The method 600 described herein may be implemented by source node 110 or any of nodes 130 or 112.

Figure 7:
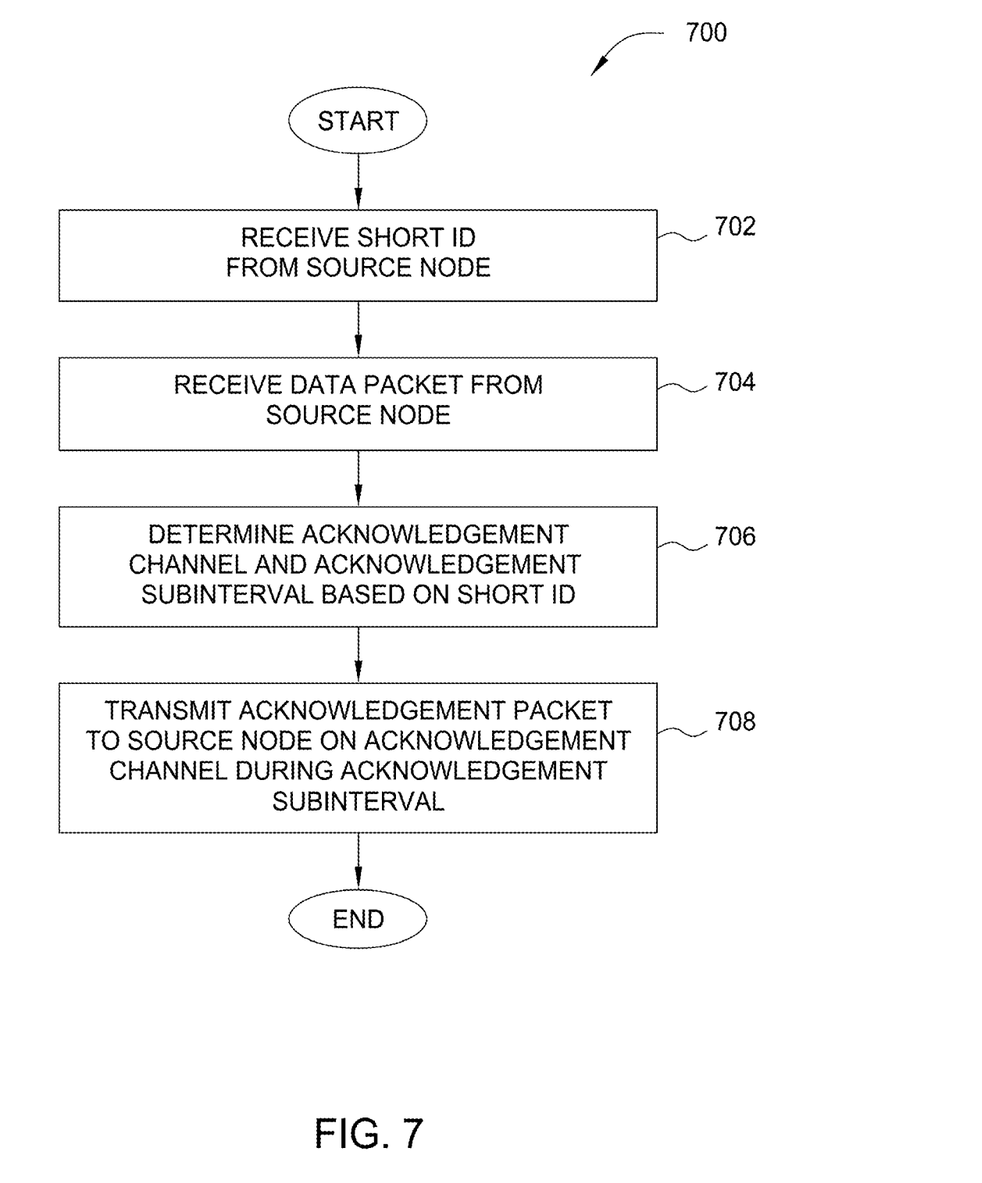
FIG. 7 is a flowchart of method steps for acknowledging receipt of a data packet, according to one embodiment of the invention.

FIG. 7 is a flowchart of method steps for acknowledging receipt of a data packet, according to one embodiment of the invention. Although the method steps are described in conjunction with the systems of FIGS. 1-3, persons skilled in the art will understand that any system configured to perform the method steps, in any order, is within the scope of the present invention.

As shown, a method 700 starts at step 702, where, a node 130 receives a short ID from source node 130. The short ID reflects a channel and sub-interval to be used by node 130 when transmitting an acknowledgement packet 304 to source 110. At step 704, node 130 receives a data packet 302 from source 110. At step 706, node 130 determines an acknowledgement channel and acknowledgement sub-interval based on the short ID received at step 702. Node 130 could, for example, determine the acknowledgement channel by dividing the number of transceiver channels used by source node 110 by the short ID, and determine the sub-interval by computing the modulo of the number of channels with the short ID. At step 708, node 130 transmits an acknowledgement packet 302 back to source node 110 on the acknowledgement channel during the acknowledgement sub-interval. The method 700 then ends.

As with the method 600 shown in FIG. 6, the method 700 shown in FIG. 7 may be implemented by any of the nodes 130 within wireless mesh network 102. By implementing the method 700, each node 130 is capable of transmitting coordinated acknowledgement packets back to the source of those packets.

In sum, a source node residing within a wireless mesh network is configured to transmit data packets to downstream nodes also residing within the wireless mesh network. Upon receipt of a data packet, a given downstream node determines a channel on which to transmit an acknowledgement packet and a sub-interval of time during which to transmit the acknowledgement packet based on a short ID assigned by the source node. At the determined sub-interval of time, the downstream node transmits the acknowledgement packet to the source node on the determined channel.

Advantageously, when a given node fails to receive a data packet from an upstream node, the upstream node may quickly determine that the data packet should be re-transmitted, thereby increasing the reliability of the wireless mesh network. Further, each upstream node is capable of coordinating incoming acknowledgement packets from downstream nodes, thereby preventing situations where a flood of acknowledgement packets overwhelms the upstream node.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

The invention claimed is:

1. A computer-implemented method for acknowledging receipt of a data packet transmitted by a first node to a second node within a network, the method comprising:
   receiving a first short identification (ID) from the first node, wherein the first short ID comprises an index into an acknowledgment scheduling table;
   receiving the data packet from the first node;
   determining a first channel based on the first short ID, wherein the first node is configured to receive transmissions on the first channel;
   determining a first sub-interval of time based on the first short ID, wherein the first node is configured to receive transmissions on the first channel during a first interval of time that includes the first sub-interval of time; and
   transmitting a first acknowledgement packet to the first node on the first channel during the first sub-interval of time, wherein the first acknowledgement packet indicates that the second node received the data packet transmitted by the first node.

2. The computer-implemented method of claim 1, further comprising:
   determining that the first node did not receive the first acknowledgement packet; and
   re-transmitting the data packet to the second node.

3. The computer-implemented method of claim 1, wherein the first node generates the first short ID based on a number of channels on which the first node is capable of receiving transmissions as well as a number of sub-intervals of time within the first interval of time.

4. The computer-implemented method of claim 1, wherein the second node is coupled to a third node within the network, and further comprising:
   receiving a second short ID from the second node;
   receiving the data packet from the second node;
   determining a second channel based on the second short ID, wherein the second node is configured to receive transmissions on the second channel;
   determining a second sub-interval of time based on the second short ID, wherein the second node is configured to receive transmissions on the second channel during a second interval of time that includes the second sub-interval of time; and
   transmitting a second acknowledgement packet to the second node on the second channel during the second sub-interval of time, wherein the second acknowledgement packet indicates that the third node received the data packet transmitted by the second node.

5. The computer-implemented method of claim 4, further comprising:
   determining that the second node did not receive the second acknowledgement packet; and
   re-transmitting the data packet to the third node.

6. The computer-implemented method of claim 4, wherein the second node generates the second short ID based on a number of channels on which the second node is capable of receiving transmissions as well as a number of sub-intervals of time within the second interval of time.

7. The computer-implemented method of claim 4, wherein each of the first node and the second node is configured to receive acknowledgement packets on multiple channels simultaneously, and wherein each of the first node and the second node is configured to receive multiple acknowledgement packets during a single interval of time.

8. The computer-implemented method of claim 4, wherein the first node resides upstream of the second node within the network, the second node resides upstream of the third node within the network, and the third node resides upstream of one or more additional nodes within the network, and wherein a given node within the network is configured to transmit a different acknowledgement packet to an upstream node upon receipt of each different data packet received from the upstream node based on a short ID assigned to the given node by the upstream node, wherein the short ID reflects a number of channels on which the upstream node is capable of receiving transmissions and a number of sub-intervals of time within an interval of time during which the upstream node is capable of receiving transmissions.

9. The computer-implemented method of claim 1, wherein the acknowledgement scheduling table includes a plurality of cells, each cell corresponding to a different transceiver channel, a different sub-interval of time, and a different short ID.

10. The computer-implemented method of claim 1, wherein determining the first channel comprises dividing a number of transceiver channels associated with the first node by the first short ID.

11. The computer-implemented method of claim 1, wherein determining the first sub-interval of time comprises computing a modulo of a number of transceiver channels associated with the first node and the first short ID.

12. A non-transitory computer-readable medium storing program instructions that, when executed by a processing unit, cause the processing unit to acknowledge receipt of a data packet transmitted by a first node to a second node within a network by performing the steps of:
receiving a first short identification (ID) from the first node, wherein the first short ID comprises an index into an acknowledgment scheduling table;
receiving the data packet from the first node;
determining a first channel based on the first short ID, wherein the first node is configured to receive transmissions on the first channel;
determining a first sub-interval of time based on the first short ID, wherein the first node is configured to receive transmissions on the first channel during a first interval of time that includes the first sub-interval of time; and
transmitting a first acknowledgement packet to the first node on the first channel during the first sub-interval of time, wherein the first acknowledgement packet indicates that the second node received the data packet transmitted by the first node.

13. The non-transitory computer-readable medium of claim 12, further comprising the steps of:
determining that the first node did not receive the first acknowledgement packet; and
re-transmitting the data packet to the second node.

14. The non-transitory computer-readable medium of claim 12, wherein the first node generates the first short ID based on a number of channels on which the first node is capable of receiving transmissions as well as a number of sub-intervals of time within the first interval of time.

15. The non-transitory computer-readable medium of claim 12, wherein the second node is coupled to a third node within the network, and further comprising the steps of:
receiving a second short ID from the second node;
receiving the data packet from the second node;
determining a second channel based on the second short ID, wherein the second node is configured to receive transmissions on the second channel;
determining a second sub-interval of time based on the second short ID, wherein the second node is configured to receive transmissions on the second channel during a second interval of time that includes the second sub-interval of time; and
transmitting a second acknowledgement packet to the second node on the second channel during the second sub-interval of time, wherein the second acknowledgement packet indicates that the third node received the data packet transmitted by the second node.

16. The non-transitory computer-readable medium of claim 15, further comprising the steps of:
determining that the second node did not receive the second acknowledgement packet; and
re-transmitting the data packet to the third node.

17. The non-transitory computer-readable medium of claim 15, wherein the second node generates the second short ID based on a number of channels on which the second node is capable of receiving transmissions as well as a number of sub-intervals of time within the second interval of time.

18. The non-transitory computer-readable medium of claim 15, wherein each of the first node and the second node is configured to receive acknowledgement packets on multiple channels simultaneously, and wherein each of the first node and the second node is configured to receive multiple acknowledgement packets during a single interval of time.

19. The non-transitory computer-readable medium of claim 15, wherein the first node resides upstream of the second node within the network, the second node resides upstream of the third node within the network, and the third node resides upstream of one or more additional nodes within the network, and wherein a given node within the network is configured to transmit a different acknowledgement packet to an upstream node upon receipt of each different data packet received from the upstream node based on a short ID assigned to the given node by the upstream node, wherein the short ID reflects a number of channels on which the upstream node is capable of receiving transmissions and a number of sub-intervals of time within an interval of time during which the upstream node is capable of receiving transmissions.

20. A computing device configured to acknowledge receipt of a data packet transmitted by a node within a network to the computing device including:
a processing unit configured to:
receive a first short identification (ID) from the node, wherein the first short ID comprises an index into an acknowledgment scheduling table,
receive the data packet from the node,
determine a first channel based on the first short ID, wherein the node is configured to receive transmissions on the first channel,
determine a first sub-interval of time based on the first short ID, wherein the node is configured to receive transmissions on the first channel during a first interval of time that includes the first sub-interval of time, and
transmit a first acknowledgement packet to the node on the first channel during the first sub-interval of time, wherein the first acknowledgement packet indicates that the computing device received the data packet transmitted by the node.

21. The computing device of claim 20, further including:
a memory coupled to the processing unit and storing program instructions that, when executed by the processing unit, cause the processing unit to:
receive the first short ID from the node,
receive the data packet from the node,
determine the first channel based on the first short ID,
determine the first sub-interval of time, and
transmit the first acknowledgement packet to the node on the first channel during the first sub-interval of time.

22. The computing device of claim 20, wherein the computing device is coupled to another node within the network that is configured to:
receive a second short ID from the computing device;
receive the data packet from the computing device;
determine a second channel based on the second short ID, wherein the computing device is configured to receive transmissions on the second channel;
determine a second sub-interval of time based on the second short ID, wherein the computing device is configured to receive transmissions on the second channel during a second interval of time that includes the second sub-interval of time; and transmit a second acknowledgement packet to the computing device on the second channel during the second sub-interval of time, wherein the second acknowledgement packet indicates that the other node received the data packet transmitted by the computing device.

23. The computing device of claim 22, wherein the node generates the first short ID based on a number of channels on which the node is capable of receiving transmissions as well as a number of sub-intervals of time within the first interval of time, and wherein the computing device generates the second short ID based on a number of channels on which the computing device is capable of receiving transmissions as well as a number of sub-intervals of time within the second interval of time.

* * * * *